United States Patent [19]
Raiteri

[11] 3,802,087
[45] Apr. 9, 1974

[54] MEASURING APPARATUS

[75] Inventor: Angelo Raiteri, Ivrea, Italy

[73] Assignee: Inductosyn Corporation, Valhalla, N.Y.

[22] Filed: July 19, 1971

[21] Appl. No.: 165,421

[52] U.S. Cl. ............................. 33/178 E, 33/143 L
[51] Int. Cl. ............................................. G01b 7/12
[58] Field of Search .......... 33/178 E, 149 J, 178 R, 33/143 L, 147 R, 147 H, 147 L, 172 E, 174 L

[56] References Cited
UNITED STATES PATENTS

| | | | |
|---|---|---|---|
| 2,249,904 | 7/1941 | Lewis................................. | 33/178 R |
| 2,745,184 | 5/1956 | Kasparson.......................... | 33/178 R |
| 2,984,953 | 5/1961 | Neal................................... | 33/143 L |
| 2,799,835 | 7/1957 | Tripp et al. ........................ | 336/123 |
| 3,717,934 | 2/1973 | Ishikawa............................ | 33/174 L |

FOREIGN PATENTS OR APPLICATIONS

| | | | |
|---|---|---|---|
| 64,575 | 5/1968 | Germany........................... | 33/178 R |
| 1,521,786 | 3/1968 | France .............................. | 33/178 R |

*Primary Examiner*—John W. Huckert
*Assistant Examiner*—John M. Jillions
*Attorney, Agent, or Firm*—William E. Beatty, Esq.

[57] ABSTRACT

Disclosed is an electronic-measuring device particularly suited for use as a grinder gage. The apparatus produces a visual digital display of a work piece dimension, such as the diameter of an object being ground. The gage includes three probes. Two of the probes (first and third) are movable over a coarse travel and the other probe (second) is movable over a fine, high-quality travel. The coarse travel is produced by the action of a manual operating lever and cam mechanism which bring the three probes into contact with the object to be measured. After contact, the operating lever and cam mechanism lock the first and third probes while unlocking the second probe. The second probe when unlocked maintains contact with the work piece over the fine travel while exerting a substantially constant force against the object during the fine measurement. The first and second probes are connected respectively to continuously operating first and second movable elements of a position-measuring device, such as an Industosyn (trademark) transducer. The third probe, which moves with the first probe, maintains the first and second probes colinear along a diameter of the object being measured.

9 Claims, 9 Drawing Figures

MEASURING APPARATUS

BACKGROUND OF THE INVENTION

The present invention relates to the field of electronic-measuring devices and particularly to gages used for the measurement of machine shop work pieces.

Prior art electronic-measuring devices, capable of making internal and external diameter measurements, are found in many different forms. Generally these devices are constituted by two mechanical arms which probe the diameter and, responsive to diameter changes, produce variations in electrical capacitors or inductors. Normally these devices furnish an electric signal when the value to which they have been calibrated is reached. Sometimes these devices also furnish other command signals at small distances from the zero point at which they are calibrated.

The accuracy of the prior art devices is insured by the use of standards in calibrating the gages at the desired zero point. The adjusting operations required to calibrate the gages at the zero point are time consuming and delicate and hence are desirably avoided where possible. The problem of continual calibration using a standard is particularly a problem where work pieces of many different sizes are to be measured one after the other.

It is an object of the present invention to overcome the need for calibration which is present in prior art electronic devices by providing a gage which may be adjusted to many different settings without need for calibration at each setting and without loss of accuracy or measurement capability.

SUMMARY OF THE INVENTION

The present invention is an electronic-measuring apparatus which, in a specific embodiment disclosed, is a grinder gage. The grinder gage employs a position-measuring device, for example, an Inductosyn transducer, which continuously measures a work piece by measuring the displacement between first and second probes which contact the work piece. One probe is attached to one member of the transducer, and the other probe is attached to the other member of the transducer. For measuring round work pieces, a third probe is provided to maintain the first and second probes colinear with the diameter being measured.

The first probe, and attached transducer member, is movable over a coarse travel, and the second probe, and attached transducer member, is movable over a fine travel. Mechanical means are provided for locking and unlocking the first and second probes at selected times to inhibit their travels. The mechanical means for locking and unlocking the first and second probes includes three cam surfaces which, upon rotation, actuate three cam followers which are a stop member for stopping the fine-travel second probe, a lock member for actuating the lock on the coarse-travel first probe and a translating member for translating the first probe.

When the first probe is unlocked for coarse travel, the second probe is inhibited from moving by the stop member. When the first probe is locked, the second probe is spring loaded so that it continuously contacts the work piece with a substantially constant force. For all movements of the first and second probes the position-measuring transducer members continuously provide a measurement of the displacement of the first and second probe. This continuous measurement is present for both coarse and fine travel. Accurate measurements are made, however, only when the coarse-travel first probe is locked and the fine-travel second probe is operative. The length of travel of the second probe is relatively short compared with that of the first probe. Further, the second probe is designed with good quality bearings in that they are smooth sliding and exhibit low run-out. The quality of travel of the first probe is not important to the accuracy of the measurements since the first probe is locked whenever high accuracy is desired. The coarse-travel first probe employs high pressure bearings which, although rough sliding, form a good seal against contamination.

The third probe, used to maintain the first and second probes colinear with the work piece diameter, is attached to and travels with the first probe while maintaining proper centering of the first and second probes. The third probe is driven by a mechanism which causes the third probe to travel a distance equal to $\sqrt{2}/2$ times the travel distance of the first probe, thereby assuring that the first, second and third probes define the desired points.

Because the position-measuring transformer continuously and accurately measures the separation of the first and second probes, and because the second probe has a limited, smooth, highly accurate travel, the grinder gage of the present invention provides a highly accurate measuring tool for the measurement of work pieces without resorting to the use of cumbersome standard gages and calibration techniques.

DETAILED DESCRIPTION

Figure 1:
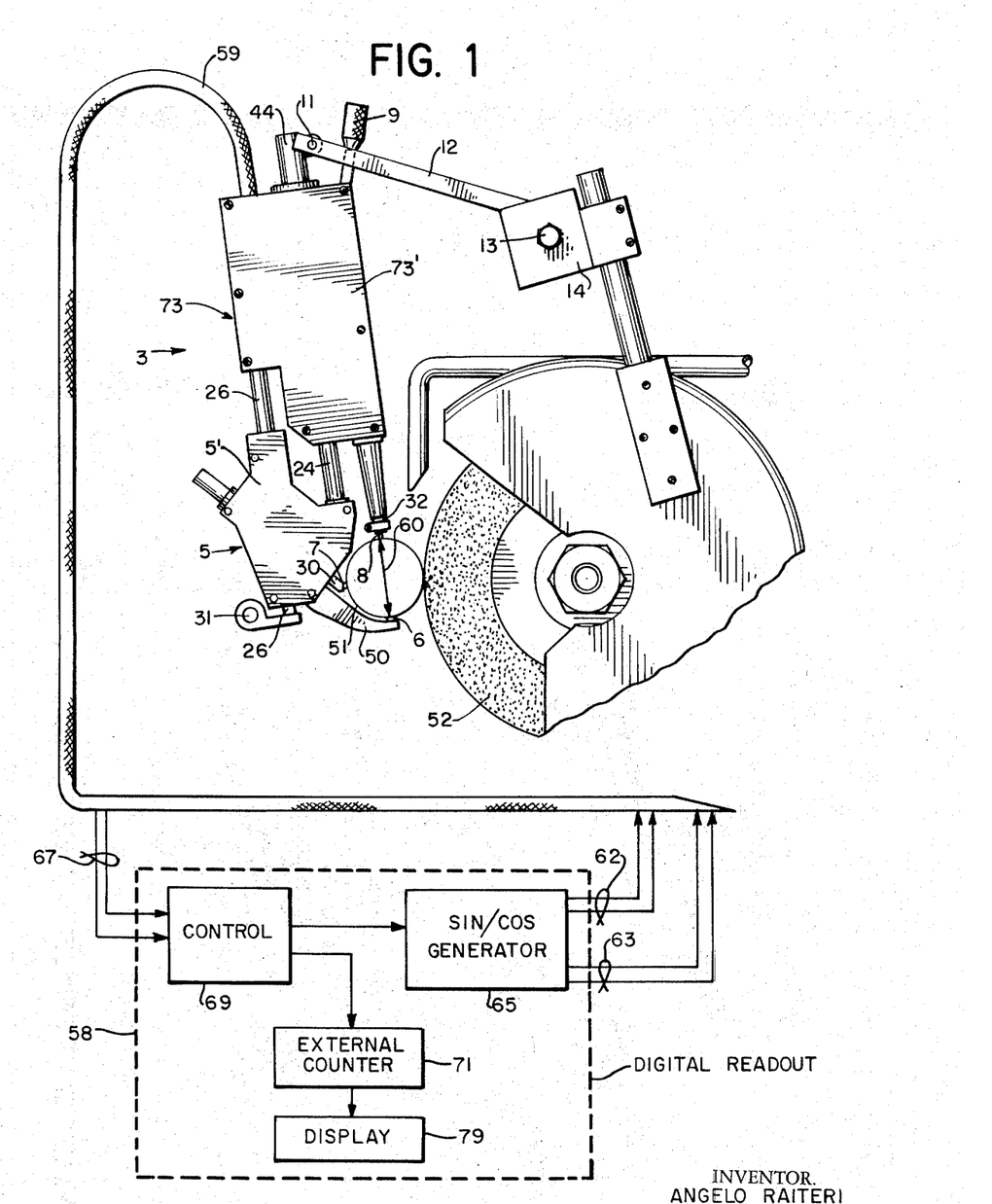
FIG. 1 depicts a schematic representation of a grinder gage positioned to measure a work piece being ground by a grinding wheel where the grinding gage is electrically coupled to a digital readout.

In FIG. 1, the grinder gage 3 is shown positioned to measure the diameter of a work piece 51 which is being ground by grinder wheel 52. Work piece 51 is typically undergoing rotation by conventional means (not shown).

The work piece 51 is positioned between a first probe 6 and a second probe 8. Probes 6 and 8 are colinear with a diameter 60 of the work piece 51. The third probe 7 maintains the probes 6 and 8 colinear with the diameter 60. The first probe 6 is attached to be fixed with respect to and moves with the shaft 24, and the second probe 8 is rigidly connected to and moves with the shaft 32. The relative linear displacement of the shafts 24 and 32, and, therefore, of the probes 6 and 8, is measured by a position-measuring device, such as an Inductosyn transducer 56 (shown in FIG. 2), enclosed within the housing of the grinder gage 3, as will be discussed in further detail in connection with FIG. 2.

The electrical connection of the grinder gage 3 is through a cable 59 connected to a digital readout 58. The digital readout 58 may be any conventional readout for use with a position-measuring transducer. When the position-measuring transducer is an Inductosyn transducer, a preferred readout is like that disclosed in U.S. Application, Ser. No. 809,533, filed Mar. 24, 1969, entitled "Position Measuring System," invented by R.W. Tripp and assigned to Inductosyn Corporation now U.S. Pat No. 3,609,320 issued 9/28/71. Preferably that digital readout includes the improvement of the U.S. Application, Ser. No. 864,079, filed Oct. 6, 1969, entitled "Trigonometric Signal Generator and Machine Control," invented by R.W. Tripp and assigned to Inductosyn Corporation now U.S. Pat. No. 3,686,487 issued 8/22/72.

Figure 2:
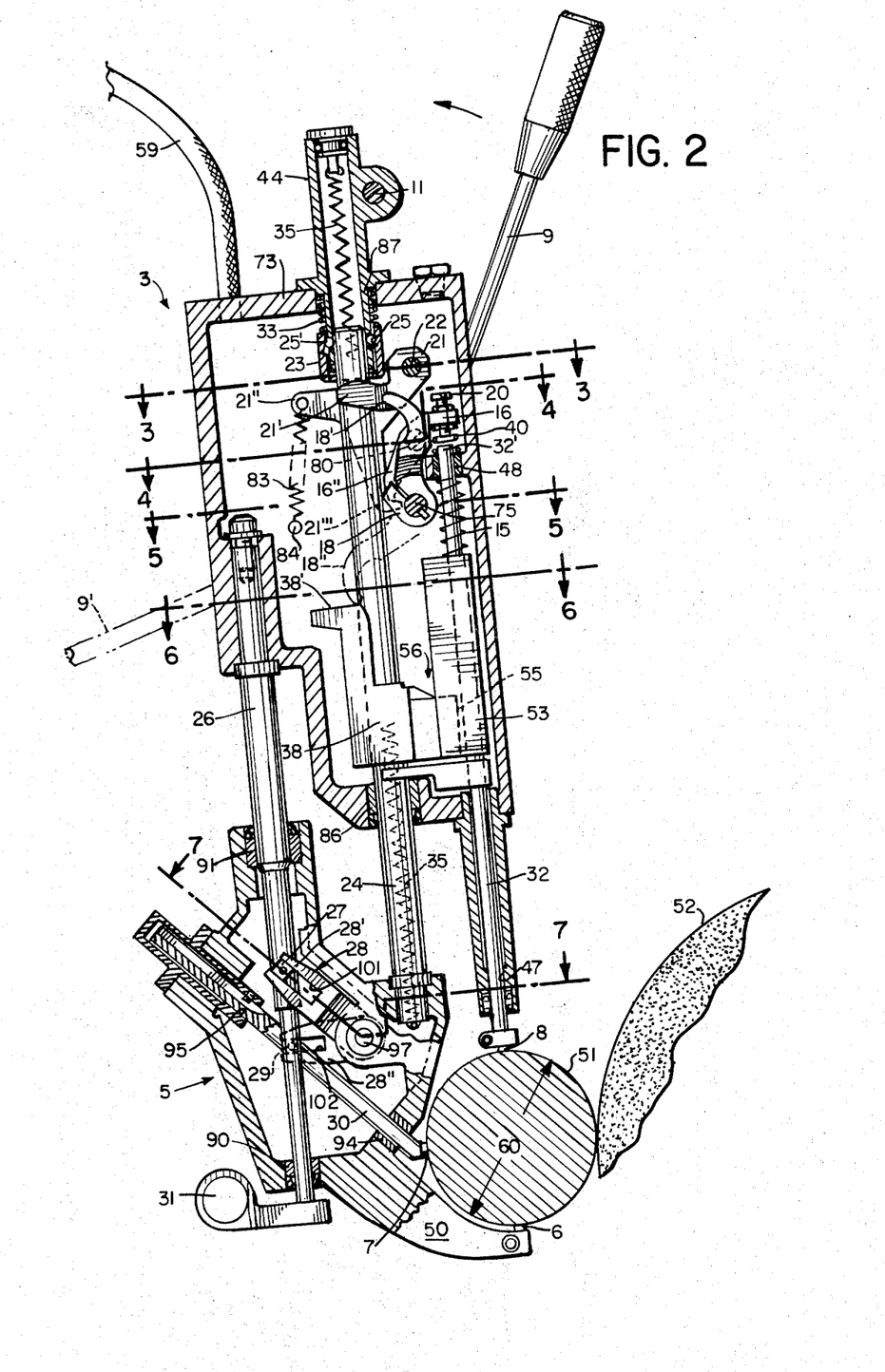
FIG. 2 depicts a longitudinal section of the grinder gage of FIG. 1 in which the various members are shown in their operating relationship.

Briefly, referring to FIGS. 1 and 2, the digital readout generates sine and cosine command signals on lines 62 and 63, respectively, in a generator 65. In a conventional manner, the sine and cosine signals on line 62 and 63 form an input to the polyphase windings 92, 93 (shown in FIG. 8) on the slider member 55 (shown in FIG. 2), attached to shaft 24 by member 38, of Inductosyn transducer 56. Still referring to FIG. 2, scale 53 attached to shaft 32, of the transducer 56 includes a reference winding 54 (shown in FIG. 8) which generates an error signal on line 67 as an input via cable 59 to the digital readout 58 of FIG. 1. The error signal typically has an amplitude which varies as a function of the linear displacement of probes 6 and 8. A typical position-measuring transducer suitable for transducer 56 is shown and described in U.S. Pat No. 2,799,835 to R.W. Tripp et al. Such transducers are marketed under the trademark, "Inductosyn." The error signal on line 67 is used in control 69 to servo the sine/cosine generator 65 and provide a digital indication of the relative position of slider 55 and scale 53 and, therefore, of probes 6 and 8. That digital indication appears in the external counter 71 which is, in turn, displayed in display 79.

When it is desired to remove the gage 3 from the work piece 51 or to position the gage 3 on any new work piece, operating lever 9 is rotated counterclockwise to cause probes 6, 7, and 8 to open wider than the work piece. By thereafter rotating lever 9 in the clockwise direction, probes 6, 7 and 8 are closed upon the work piece with probes 6 and 8 along the to-be-measured diameter as insured by probe 7. Further details of the gage 3 are described in connection with FIG. 2.

With reference to FIG. 2, probe 6 is conveniently referred to as the first probe or coarse-travel probe, and it is attached, by casing 5, to a first probe member in the form of shaft 24. Shaft 24, and therefore probe 6 and slider 55, has a coarse travel with respect to the casing 73 through sliding bearings 86 and 87. Shaft 24 is shown in FIG. 2 near the extreme open end of its travel. Shaft 24 is, at times, locked in any one of many positions by a locking collar 23 and ball bearings 25 and 25' which become wedged, when cam follower 21 does not force against and thereby unlock collar 23, between collar 23 and shaft 24. Spring 33 urges locking collar 23 to locked position. Tension spring 35 runs the full length of and through the center of shaft 24 urging shaft 24 in a more closed direction, that is, in a direction which urges probe 6 toward probe 8. Shaft 24 extends into hollow member 44 mounted on casing 73 when shaft 24 is moved toward its closed end of travel. Cam follower 21, mounted on casing 73 by shaft 22, is a lock travel member for locking and unlocking collar 23. The actuation of the cam follower 21 will be described hereinafter in connection with the operating lever 9.

Shaft 24 has connected rigidly to it a translating member 38, which has a cam following surface 38' for following the cam 18 and which carries slider 55 of transducer 56, as will be described in more detail hereinafter in connection with operating lever 9.

In FIG. 2, probe 8 is conveniently referred to as the fine-travel probe, and it is attached to the second probe member constituted by shaft 32. Shaft 32, and, therefore, probe 8 and scale 53, has a fine travel parallel to the coarse travel of shaft 24, through slide bearings 47 and 48. Compression spring 15, compressed between scale 53 and bearing 48, urges shaft 32 and scale 53 toward probe 6. When probes 6 and 7 are locked in a fixed position determined by the work piece size, as occurs when lever 9 is in its extreme clockwise position so that cam follower 21 does not contact collar 23, spring 15 operates to maintain probe 8 in contact with the work piece 51 with a substantially constant force. If work piece 51 is rotated, as normally occurs during grinding, probe 8 remains in contact and in so doing may cause shaft 32 to travel over small increments of its fine travel. In this way, scale 53 also travels relative to the then fixed slider 55 and develops the error signal on line 67 which results in the substantially continuous electronic digital display of the work piece diameter 60. Any changes in that diameter during rotation or because of grinding are displayed.

Whenever probes 6 and 7 are unlocked, by counter clockwise rotation of lever 9, the stop lever 16, mounted on casing 73 by shaft 80, is rotated toward the end 32' of shaft 32 to prevent shaft 32 from being driven to its extreme end of travel in a direction away from probe 6. Further details of the stop lever 16 will be discussed in connection with the operating lever 9 hereinafter.

Still referring to FIG. 2, the third probe 7 is part of the slidable casing 5 which translates with probe 6. Additionally, slidable casing 5 slides over the fixed shaft 26 on sliding bearings 90 and 91. A pivoting member 28, having slotted fork portions 28' and 28" which have slots 101 and 102, respectively, slidably engages pinned blocks 27 and 29, respectively, translates shaft 30 connected to probe 7 through slide bearings 94 and 95 in slidable casing 5. Pivoting member 28 rotates about shaft 97, attached to casing 5, as a function of the position of casing 5 relative to the block 27 which is pivotally connected to shaft 26. As member 28 slides with shaft 97 and casing 5 relative to block 27 and pivots about shaft 97, the fork portion 28'' of member 28 slides relative to block 29, which is pivotally connected to shaft 30. Rotation of fork 28'' about shaft 97 drives block 29 thereby causing shaft 30 to slide through sliding bearings 94 and 95.

Further details of the slidable casing 5 are discussed and described with reference to FIG. 7.

The operating lever 9, the cam surfaces and the cam followers which function to lock (sometimes called "stop"), unlock and translate the various mechanisms of the grinder gage will now be described with reference to FIGS. 2 through 6.

Figure 3:
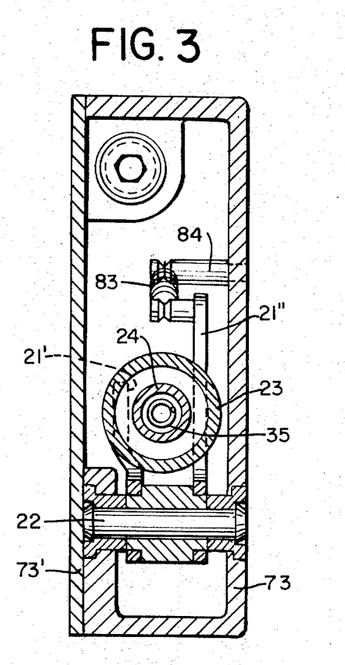
FIG. 3 depicts a cross-sectional view taken along the section line 3—3 of FIG. 2 and depicts the cam-operated lock member and locking collar.

Referring specifically to FIGS. 2 and 3, cam follower 21, which rotates about pivot pin 22 held by casing 73 has two arms 21' and 21'' which engage locking collar 23. Locking collar 23 encircles tha shaft 24 and locks or unlocks it as previously described. Cam follower 21 additionally includes the cam following point 21''', which follows the cam 77, hereinafter described in connection with FIGS. 2 and 5.

Figure 4:
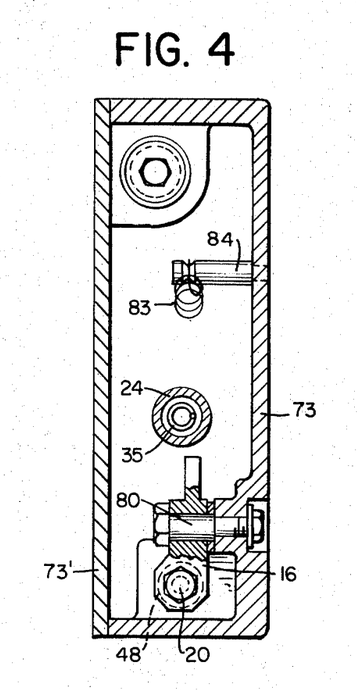
FIG. 4 depicts a cross-sectional view taken along the section line 4—4 of FIG. 2 and depicts the cam-operated stop member.

Referring to FIGS. 2 and 4, the stop lever 16 which rotates about pivot pin 80 is shown. Stop lever 16 carries an adjusting bolt 20, through the end of lever 16 in the general proximity to the end 32' of shaft 32, which serves to adjust the gap between the end 32' and the bolt 20. Stop lever 16 also includes a cam following end 16'', which follows cam 78, as further described hereinafter in connection with FIGS. 2 and 5. In FIG. 2, compression spring 40, between bearing 48 and stop lever 16 (surrounding bolt 20), urges stop lever 16 and bolt 20 away from the end 32' when the force of spring 40 is not overcome by stop lever 16 and the action of cam 78 and end 16'' (see FIGS. 2 and 5).

Figure 5:
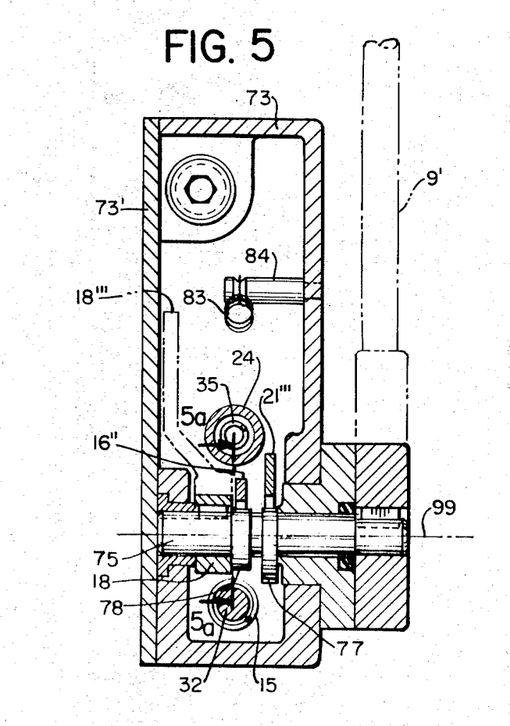
FIG. 5 depicts a cross-sectional view taken along the section line 5—5 of FIG. 2 and shows the operating relationship between the operating lever and cams, the stop member of FIG. 4 and the locking member of FIG. 3.
Figure 6:
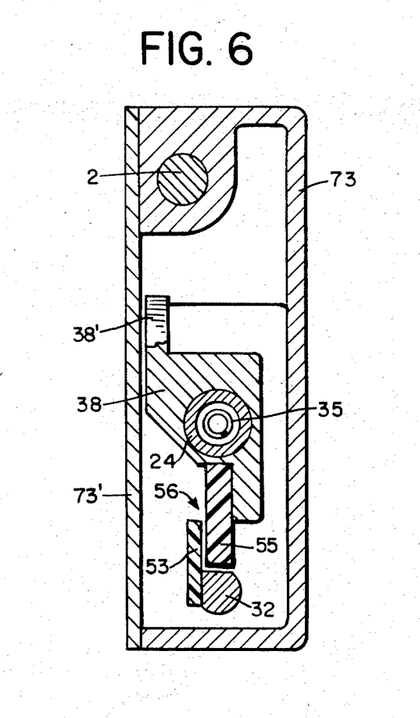
FIG. 6 depicts a cross-sectional view taken along the section line 6—6 of FIG. 2 and depicts the relatively movable members of the position-measuring transformer.

Referring now to FIGS. 2 and 5, the operating lever 9 rigidly connected to the cams 18, 77 and 78, rotates about axis 99 of shaft 75 so as to actuate the cam followers 16'', 21''' and 38' (cam follower surface 38' is shown in FIG. 6). Still referring to FIGS. 2 and 5, the cam 18 with its cam surface 18' is or is not in contact with the cam following surface 38' depending upon the position of operating lever 9 and upon the size of the work piece 51 contacted by the probes 6 and 8.

In FIG. 2, with lever 9 in its fully clockwise position, as shown, cam surface 18' and cam following surface 38' are widely separated. In the fully clockwise position, although spring 35 tends to pull shaft 24 and therefore member 38 toward the hollow mount 44, locking collar 23 prevents the member 38 from moving. When locking lever 9 is rotated counter-clockwise to the phantom position 9', the cam surface 18' is similarly rotated to its phantom position 18'' where it contacts cam following surface 38'. The extreme counter-clockwise rotation of lever 9 causes the cam surface 18' (as shown at the phantom 18'' position) to drive the cam following surface 38' and therefore shaft 24 and probe 6 overcoming the force of spring 35 thereby displacing probes 6 to 8 to a dimension greater than work piece 51.

The work piece 51 (FIG. 2 is smaller than actual size) is approximately the maximum diameter work piece that can be employed with the grinder gage of FIG. 2 since shaft 24 and sliding casing 5 are at approximately their full end of travel. For smaller diameter work pieces, the cam surface 18' and the cam following surface 38' will separate, due to the locking action of locking collar 23, at any position between phantom position 18'' of same surface 18' and the shown position cam surface 18'.

Figure 5A:
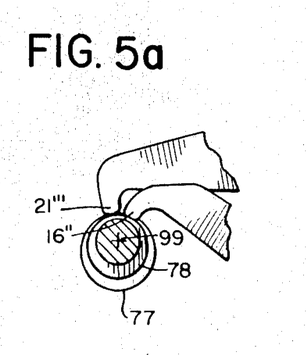
FIG. 5(a) depicts a view taken along the sectional line 5a—5a of FIG. 5 to show the further cam/cam follower relationship.

Referring still to FIGS. 2 and 5, the rotation of lever 9 and therefore the shaft 75 is also operative to actuate the cam following ends 16'' and 21'''. The nature of that operation is further explained with reference to FIG. 5a. In FIG. 5a, the cam following end 16'' is depicted following the cam 78. It can be noted in FIG. 5 and in FIG. 5a that both cams 77 and 78 are off center with respect to the axis 99 of shaft 75 so that as shaft 75 is rotated by lever 9 cam following points 16'' and 21'' move either toward or away from axis 99. Note that, as shown in FIG. 2, compression spring 40 exerts a force which continuously tends to rotate stop lever 16 in a counter-clockwise direction around shaft 80 (also see FIG. 4) which maintains cam following point 16'' in contact with cam 78. In a similar manner, referring to FIGS. 2, 3, 5 and 5a, tension spring 83 tends to rotate cam follower 21 about pivot pin 22 thereby also maintaining cam following point 21''' in contact with cam 77.

In FIG. 5, and FIG. 5a, cams 77 and 78 are shown with lever 9, in FIG. 2, in its fully clockwise position. Under this condition, cam surface 18' and lever 9 are not readily viewable in FIG. 5. Accordingly, in FIG. 5, the lever 9 is shown in phantom position 9' and the cam following surface 18' is shown in a phantom position 18''' which positions are those which would result in FIG. 2 about half-way between lever 9 and phantom position 9'.

Figure 8:
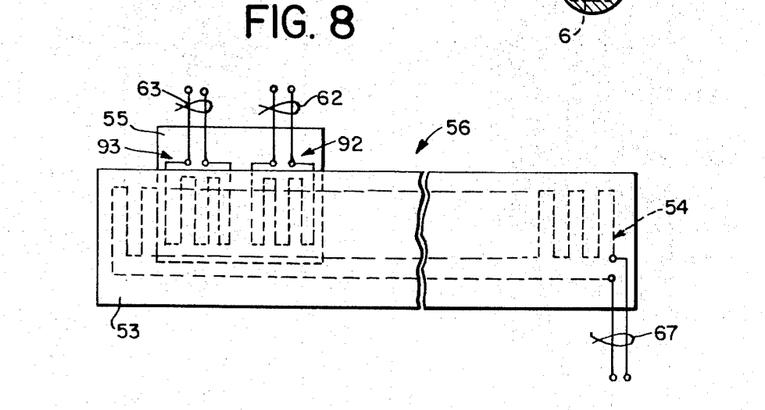
FIG. 8 depicts a front view of the position-measuring transducer 56 including slider 55, scale 53 and the various windings thereon.

Referring to FIGS. 2, 6 and 8, the translating member 38, moved by the cam surface 18' against cam following surface 38' or by tension spring 35, carried with it the slider 55 of position-measuring transformer 56. Slider 55 and scale 53, the latter mounted to the shaft 32, are substantially parallel and move over the coarse and fine travels to FIG. 8, the slider 55 includes polyphase windings 92 and 93 which connect to lines 62 and 63, respectively, which are derived from the digital readout 58 of FIG. 1. In FIG. 8, the polyphase windings 92 and 93 on slider 55 are positioned opposite the reference winding 54 on the scale 53. Reference winding 54 is connected by lines 67 to the control 69 of readout 58 in FIG. 1.

Figure 7:
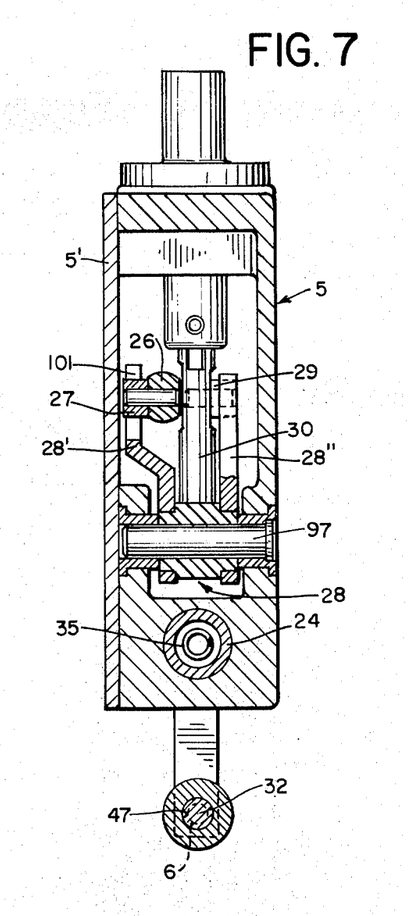
FIG. 7 depicts a cross-sectional view taken along the section line 7—7 of FIG. 2 and depicts the mechanism for moving the third probe.

Referring now to FIGS. 2 and 7, the sliding casing 5 and its manner of positioning the arm 50, probe 6 and probe 7 will be described. The fixed shaft 26 has pinned block 27 rotably attached to it to engage one fork 28' of the pivoting member 28. Sliding casing 5, including its cover 5', may be moved relative to fixed shaft 26 by the action of sliding shaft 24 either with or against the force of spring 35. As casing 5 moves to change its relative separation from casing 73, fork 28' slides with respect to the pinned block 27 causing fork 28' to rotate about shaft 97. Fork 28'' is rigidly connected, as a part of pivoting member 28, to fork 28' so that as fork 28' rotates, it causes fork 28'' to rotate. Rotation of fork 28'' causes that fork to slide with respect to pinned block 29 forcing pinned block 29 to move shaft 30.

Referring specifically to FIG. 2, shaft 30 is held by sliding bearings 94 and 95 such that an imaginery line between probes 6 and 7 is exactly equal to 45° from an imaginery line between probes 6 and 8. This 45-° angle between the two imaginary lines is maintained independent of the diameter of work piece 51.

This 45-degree relationship results in a travel of the probe 7 equal to the $\sqrt{2}/2$ travel of the probe 6.

In summary, the relative movement of the casings 5 and 73 effects separation of the probes 6 and 8 and coordinates movement of the probe 7 in order to maintain probes 6 and 8 colinear with the diameter being measured.

OPERATION

Again referring to FIG. 2, the operation of the cam mechanism is commenced when lever 9 is in the extreme clockwise position as shown. In this position, adjusting bolt 20 is positioned with a clearance distance between bolt 20 and the end 32' of shaft 32. Under this condition, shaft 32 is forced by compression spring 15 to urge probe 8 against the work piece 51. When work piece 51 is rotated (by conventional means not shown), any eccentricity of work piece 51 or any change in diameter of work piece 51 results in a linear movement of shaft 32 either toward or away from probe 6. Compression spring 15 causes shaft 32, and particularly probe 8, to follow the surface of work piece 51 and, accordingly, scale 53 changes its relative position with respect to slider 55.

With operating lever 9 in its extreme clockwise position as described, cam follower 21 is rotated by spring 83 counter-clockwise around pivot pin 22, leaving a clearance distance between cam follower 21 and locking collar 23. With this clearance distance, spring 33 urges locking collar 23 inwardly to wedge ball bearings 25 and 25' against shaft 24 to lock shaft 24 to casing 73; and, therefore, shaft 24 and probes 6 and 7 are in a fixed position. When it is desired to remove work piece 51 or insert a new work piece, operating lever 9 is rotated counter-clockwise, whereby cam 78 rotates to lift stop lever 16 and rotate it clockwise about shaft 80. When shaft 80 is rotated further counter-clockwise, adjusting bolt 20 rotates to a fixed position near the end 32' of shaft 32. This fixed position of stop lever 16 inhibits the movement of shaft 32, in a direction away from probe 8, beyond the position determined by bolt 20. Accordingly, compression spring 15 is not compressed beyond its linear region of operation. Further rotation of the operating lever 9 in the counter-clockwise direction causes cam member 77 to lift the cam following point 21''', causing cam follower 21 to rotate clockwise about pivot support 22, overcoming the retracting force of retracting spring 83. When cam follower 21 is rotated clockwise, it engages locking collar 23, moving that collar in a direction toward mount 44 against the force of compression spring 33 whereby ball bearings 25 and 25' are relieved of their frictional forces against shaft 24, thereby allowing shaft 24 to be pulled toward mount 44 by tension spring 35. With collar 23 unlocked, probe 6, by the force of tensioning spring 35, forces the work piece 51 firmly against probe 8, thereby causing probe 8 to be translated in a direction toward bolt 20 with shaft 32 until the end 32' of shaft 32 is stopped by bolt 20 in stop lever 16. The force of spring 35 is great enough to overcome compression spring 15.

If it is desired to remove work piece 51 or insert a new work piece, counter-clockwise rotation of operating lever 9 causes tip 18' of cam 18 to engage the face 38' of member 38. Further counter-clockwise rotation of lever 9 causes cam 18 to force cam following surface 38' and shaft 24 in a direction away from mount 44, thereby enlarging the opening between probes 6 and 8. With the opening between probes 6 and 8 larger than the work piece to be measured, operating lever 9 may be reversed in direction by clockwise rotation until a point of rotation is reached where the retraction of tip 18' allows probe 6, pulled by spring 35 and casing 5, to contact work piece 51, driving the work piece, probe 8 and shaft 32 against the bolt 20 of stop lever 16. Thereafter, further clockwise rotation of lever 9 causes cam 77 (see FIG. 5a) to allow the cam following point 21''', by the force of spring 83 to rotate cam follower 21 counter-clockwise. The counter-clockwise rotation of cam follower 21 allows spring 33 to translate collar 23 in a direction away from mount 44 thereby forcing ball bearings 25 and 25' to frictionally engage and lock shaft 24 and probes 6 and 7 at a fixed position. Further clockwise rotation of operating lever 9 causes cam 78 to rotate allowing spring 40 to cause stop lever 16 to rotate counter-clockwise about shaft 80. Rotation of stop lever 16 counter-clockwise removes bolt 20 from the shaft end 32', thereby allowing compression spring 15 to force shaft 32 and probe 8 against work piece 51.

With operating lever 9 in the fully clockwise position, grinder gage 3 is again ready to continuously measure with high accuracy the diameter of a work piece.

FURTHER AND OTHER EMBODIMENTS

While the invention has been described in connection with position-measuring transducers commonly marketed under the trademark "Inductosyn," other position-measuring devices such as optical fringes may be employed in the present invention.

The probes 6, 7 and 8 of the present invention may be generally described as "contacts" in that they contact the work piece to be measured. The probes of the present invention, however, may employ air cushions or other forms of non-contacting devices although, in general, the contacting type are preferred. One particular probe (sometimes called "tip") particularly suitable for the present invention is a diamond since diamonds have a high wear resistance.

Although the present invention is specifically designed for measuring external diameters, the role of probes 6 and 8 may be reversed in order to measure internal diameters. Suitable extensions of the probes 6, 7 and 8 for reversing the roles will be apparent to those skilled in the art.

Since the force of spring 35 (see FIG. 2) may propel the sliding casing 5 at an undesirably high velocity, a dashpot may be added to slow down casing 5. A dashpot may be added, for example, to shaft 24.

For measuring diameters, the third probe 7 is useful in maintaining the probes 6 and 8 colinear with the diameter of the work piece 51. Although $\sqrt{2}/2$ travel has been indicated as preferred, other angular relationships may be employed. In general, all that is required is that probe 7 have some component or relative travel normal to an imaginery line between probes 6 and 8 and maintain itself equally spaced between probes 6 and 8.

Referring to FIG. 1, the support 44 is actually connected by pin 11 to a rod 12 which is in turn rotably connected at 13 to a fixed member 14. The mechanism 11, 12, 13 and 14 is designed to support the weight of the grinder gage 3 and facilitate positioning of the probes 6, 7 and 8 onto the work piece 51. Finger hole 31 is conveniently provided for rotating the grinder gage 3 about the shaft 11 while the member 13 allows the rotation of arm 12 about member 14. In this manner, substantially none of the weight of the grinder gage 3 is supported at probe 8.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Measuring apparatus comprising the combination of a relatively movable first casing having associated therewith a first probe, and a relatively fixed second casing having associated therewith a second probe, means supporting said first casing for sliding movement on said fixed shaft, said first casing having fixed thereto a slidable first shaft slidably carried by said second casing, a slidable second shaft slidably carried by said second casing and terminating in said second probe, a fixed third shaft attached to said second casing, said first, second and fixed third shafts being parallel to each other, said first casing having an arm carrying said first probe opposite said second probe, spring means for urging said second probe into engagement with one side of a work piece, said first casing being movable to urge said first probe toward said second probe and into engagement with an opposite side of the work piece, a position-measuring device in said second casing having relatively movable, inductively related elements, one of said elements being fixed to said first shaft, and the other of said elements being fixed to said second shaft, said position-measuring device producing a signal corresponding to the separation of said probes, and means for reading out said signal.

2. Apparatus according to claim 1, said first casing having means supporting a third probe and including a mechanical movement responsive to relative movement of said first and second casings to coordinate the movement of said third probe and maintain said first and second probes colinear with the diameter of a work piece being measured.

3. Apparatus according to claim 1, said second casing having manually operable means associated with said first and second shafts for adjusting the separation of said first and second probes.

4. A gage for measuring dimensions comprising, a first probe member movable over a coarse travel and lockable at selected positions, a second probe member movable over a fine travel when said first probe is locked, a position-measuring apparatus including first and second transducer members connected to said first and second probe members respectively, said first and second transducer members electrically related to continuously measure the displacement of said first and second probe members during said coarse and said fine travel and thereby measure said dimensions, a third probe member having a component of travel normal to the travel of said first and second probe members for maintaining said first and second probe members substantially colinear with a diameter of a work piece to be measured, and an operating mechanism for moving said first and third probe members over said coarse travel to engage said probe members with a work piece and for inhibiting the movement of said second probe member when said first and third probe members are unlocked for moving, wherein said operating mechanism includes, a rotatable member having first, second and third cams, a first cam follower actuated by said first cam for inhibiting the movement of said second probe member, a second cam follower actuated by said second cam for unlocking said first probe member, a third cam follower actuated by said third cam for translating said first probe.

5. A gage for measuring the diameter of a round work piece wherein a movable first probe contacts said work piece at one point, wherein a movable second probe contacts said work piece at a second point, and wherein a movable third probe contacts said work piece at a third point to maintain said first and second probes colinear with a diameter of the work piece, the improvement comprising, operating means for stopping said second probe short of an extreme end of a fine travel when said first probe is moved over a coarse travel to bring said first, second and third probes into contact with said work piece, said operating means including means for unstopping said second probe, thereby allowing full travel over said fine travel, said operating means also including means for locking said first probe when said first, second and third probes are in contact with said work piece, a position-measuring apparatus including a transducer having a first element connected to said first probe and a second element connected to said second probe, said first and second elements electrically related to continuously measure the relative displacement between said first and second probes during both coarse and fine travel and thereby measure the diameter of the work piece.

6. The gage of claim 5 further including, first means for spring loading said first probe toward said second probe, second means for spring loading said second probe toward said first probe, said means for stopping operative to inhibit said first means from negating the loading action of said second means and from driving said second probe to the second probe's extreme end of travel.

7. The gage of claim 6 wherein said first and second elements are relatively movable elements of a position-measuring transformer, wherein one of said elements includes a reference winding having active conductors transverse to the directions of travel of said first and second probes and equally spaced to define a reference cycle, wherein the other of said elements includes a plurality of polyphase windings having active conductors spaced to form polyphase signals with respect to said reference winding, and a digital readout apparatus for energizing said polyphase windings and forming from the error signal induced in said reference winding a digital readout representing the diameter of the work piece.

8. The gage of claim 7 further including, a balancing mechanism for supporting said gage in the vicinity of said work piece whereby the weight of said gage is supported by said mechanism thereby allowing said second means to force said second probe against said work piece with a substantially constant force.

9. A gage for measuring the diameter of a round work piece wherein a movable first probe contacts said work piece at one end of a diameter, wherein a second probe contacts said work piece at the opposite end of said diameter, and wherein a movable third probe maintains said first and second probes colinear with said diameter, the improvement comprising, means for maintaining, at any point over a fine travel, said first and second probes in contact with said work piece with a substantially constant force,
 means for moving said first and third probes over a coarse travel to bring said first, second and third probes into contact with said work piece,
 stop means for stopping said second probe when said first and third probes are moved over said coarse travel,
 means for locking said first and third probes when said first, second and third probes are in contact with said work piece and for unlocking said stop means to allow said second probe to move over its fine travel,
 a position-measuring apparatus including a transducer having a first element connected to said first probe and a second element connected to said second probe, said first and second elements electrically related to continuously provide an electrical measure of the displacement of said first and second probes and thereby measure the diameter of said work piece.

* * * * *

UNITED STATES PATENT OFFICE
CERTIFICATE OF CORRECTION

Patent No. 3802087　　　　　　　　　Dated April 9, 1974

Inventor(s) Angelo Raiteri

It is certified that error appears in the above-identified patent and that said Letters Patent are hereby corrected as shown below:

Column 4, line 35, change "has" to -- have --.
Column 5, line 23, change "tha" to -- the --.
Column 6, last line, change "imaginery" to -- imaginary --.
Column 7, line 2, change "imaginery" to -- imaginary --.
Column 8, line 63, change "imaginery" to -- imaginary --.
Column 9, line 22, change "said fixed shaft" to -- a fixed third shaft --; line 25, change "a" to -- said --.

Signed and sealed this 10th day of September 1974.

(SEAL)
Attest:

McCOY M. GIBSON, JR.　　　　　　　　C. MARSHALL DANN
Attesting Officer　　　　　　　　　　Commissioner of Patents